US011692598B2

(12) United States Patent
Brevick

(10) Patent No.: US 11,692,598 B2
(45) Date of Patent: Jul. 4, 2023

(54) SWITCHABLE ONE-WAY CLUTCH

(71) Applicant: Schaeffler Technologies AG & Co. KG, Herzogenaurach (DE)

(72) Inventor: John Brevick, Newaygo, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/487,143

(22) Filed: Sep. 28, 2021

(65) Prior Publication Data

US 2023/0096201 A1 Mar. 30, 2023

(51) Int. Cl.
*F16D 41/12* (2006.01)
*F16D 41/14* (2006.01)

(52) U.S. Cl.
CPC ........... *F16D 41/14* (2013.01); *F16D 41/125* (2013.01)

(58) Field of Classification Search
CPC ................................................. F16D 41/12–16
See application file for complete search history.

(56) References Cited

U.S. PATENT DOCUMENTS

| | | | |
|---|---|---|---|
| 6,116,394 A | 9/2000 | Ruth | |
| 6,186,299 B1 | 2/2001 | Ruth | |
| 6,244,965 B1 * | 6/2001 | Klecker | F16D 41/14 464/81 |
| 6,332,520 B1 | 12/2001 | Costin | |
| 8,286,772 B2 | 10/2012 | Eisengruber | |
| 11,047,432 B2 * | 6/2021 | Brezger | F16D 41/069 |
| 2008/0169165 A1 | 7/2008 | Samie et al. | |
| 2010/0252384 A1 * | 10/2010 | Eisengruber | F16D 41/14 192/43.1 |
| 2015/0354640 A1 * | 12/2015 | Papania | F16D 41/14 192/46 |
| 2018/0355963 A1 | 12/2018 | Samie et al. | |
| 2019/0345995 A1 * | 11/2019 | Brezger | F16D 41/069 |

FOREIGN PATENT DOCUMENTS

| | | |
|---|---|---|
| JP | 2008-008441 A | 1/2008 |
| WO | 98-49456 A1 | 11/1988 |

* cited by examiner

*Primary Examiner* — David R Morris
(74) *Attorney, Agent, or Firm* — Volpe Koenig, P.C.

(57) ABSTRACT

A one-way clutch, including: a case; a drive plate enclosed by the case and defining openings; a first plate non-rotatably connected to the case and defining a first opening; a rotatable actuator plate; a strut including a central portion, an engagement portion, and a control portion; and a spring. In a locked mode: the spring pivots the engagement portion into an opening of the drive plate, a rotation of the drive plate in a first direction is enabled, and a rotation of the drive plate in a second direction is blocked. To transition from the locked mode to a free-wheel mode, in which the rotation of the drive plate in the second direction is enabled, the actuator plate is rotated by an actuator to contact the control portion and pivot the strut to displace the engagement portion out of the opening of the drive plate.

20 Claims, 6 Drawing Sheets

SWITCHABLE ONE-WAY CLUTCH

TECHNICAL FIELD

The present disclosure relates to a switchable one-way clutch with rotational actuation control.

BACKGROUND

Known switchable one-way clutches use axial displacement to control operation of the clutch.

SUMMARY

According to aspects illustrated herein, there is provided a switchable one-way clutch, including: a ring-shaped case including a radially inner surface; a drive plate radially enclosed by the radially inner surface, supported for rotation around an axis of rotation, arranged to non-rotatably connect to a shaft, and defining a plurality of openings; a first plate non-rotatably connected to the radially inner surface of the ring-shaped case and defining a first opening; a second plate non-rotatably connected to the radially inner surface of the ring-shaped case; a rotatable actuator plate; a strut supported for pivoting around a pivot axis, the strut including a central portion disposed in the first opening and through which the pivot axis passes, an engagement portion extending from the central portion, and a control portion extending from the central portion; and a spring in contact with the second plate and the engagement portion. In a locked mode of the switchable one-way clutch, the spring urges the engagement portion in a first pivot direction around the pivot axis and into an opening included in the plurality of openings, a rotation of the drive plate with respect to the ring-shaped case and in a first rotational direction around the axis of rotation is enabled, and a rotation of the drive plate with respect to the ring-shaped case in a second rotational direction opposite the first rotational direction is blocked. To transition from the locked mode to a free-wheel mode of the switchable one-way clutch, in which the rotation of the drive plate with respect to the ring-shaped case and in the second rotational direction is enabled, the rotatable actuator plate is arranged to be rotated by an actuator, and the rotatable actuator plate is arranged to contact and displace the control portion to pivot the strut in a second pivot direction, opposite the first pivot direction, and pivot the engagement portion out of the opening included in the plurality of openings.

According to aspects illustrated herein, there is provided a switchable one-way clutch, including: a ring-shaped case including a radially inner surface defining a central opening; a drive plate radially enclosed by the radially inner surface, supported for rotation around an axis of rotation, arranged to non-rotatably connect to a shaft, and defining a plurality of openings; a first plate non-rotatably connected to the radially inner surface and defining a first opening; a second plate non-rotatably connected to the radially inner surface and defining a second opening; a rotatable actuator plate including a planar surface and a feature extending from the planar surface in an axial direction parallel to the axis of rotation, the axial direction from the rotatable actuator plate toward the drive plate; a strut pivotable around a pivot axis, the strut including a central portion disposed in the first opening and through which the pivot axis passes, an engagement portion extending from the central portion, and a control portion extending from the central portion; and a spring in contact with the engagement portion and the second plate. In a locked mode of the switchable one-way clutch, the spring urges the engagement portion in a first pivot direction around the pivot axis and into an opening included in the plurality of openings, a rotation of the drive plate with respect to the ring-shaped case and in a first rotational direction around the axis of rotation is enabled, and a rotation of the drive plate with respect to the ring-shaped case in a second rotational direction opposite the first rotational direction is blocked. To transition from the locked mode to a free-wheel mode of the switchable one-way clutch, in which the rotation of the drive plate with respect to the ring-shaped case and in the second rotational direction is enabled, the rotatable actuator plate is arranged to be rotated by an actuator, the rotatable actuator plate is arranged to slide the feature along the control portion in the first rotational direction, and the feature is arranged to pivot the engagement portion out of the opening included in the plurality of openings.

According to aspects illustrated herein, there is provided a method of operating a switchable one-way clutch, the switchable one-way clutch including a ring-shaped case including a radially inner surface defining a central opening, a drive plate radially enclosed by the radially inner surface, supported for rotation around an axis of rotation, arranged to non-rotatably connect to a shaft, and defining a plurality of openings, a first plate non-rotatably connected to the radially inner surface and defining a first opening, a second plate non-rotatably connected to the radially inner surface and defining a second opening, an actuator plate including a planar surface and a feature extending from the planar surface in an axial direction parallel to the axis of rotation, the axial direction from the actuator plate toward the drive ring, a strut including a central portion disposed in the first opening, an engagement portion, and a control portion; and a spring in contact with the engagement portion and the second plate. The method includes: urging, with the spring, the engagement portion in a first pivot direction around a pivot axis and into a first opening included in the plurality of openings; enabling a rotation of the drive plate with respect to the ring-shaped case and in a first rotational direction around the axis of rotation; blocking, with the strut, a rotation of the drive plate with respect to the ring-shaped case in a second rotational direction opposite the first rotational direction; rotating, with an actuator, the actuator plate in the first rotational direction; sliding the feature along the control portion in the first rotational direction; pivoting, with the feature, the control portion out of the first opening included in the plurality of openings; and enabling a rotation of the drive plate with respect to the ring-shaped case and in the second rotational direction around the axis of rotation.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices, or materials similar or equivalent to those described herein can be used in the practice or testing of the disclosure.

Figure 1:
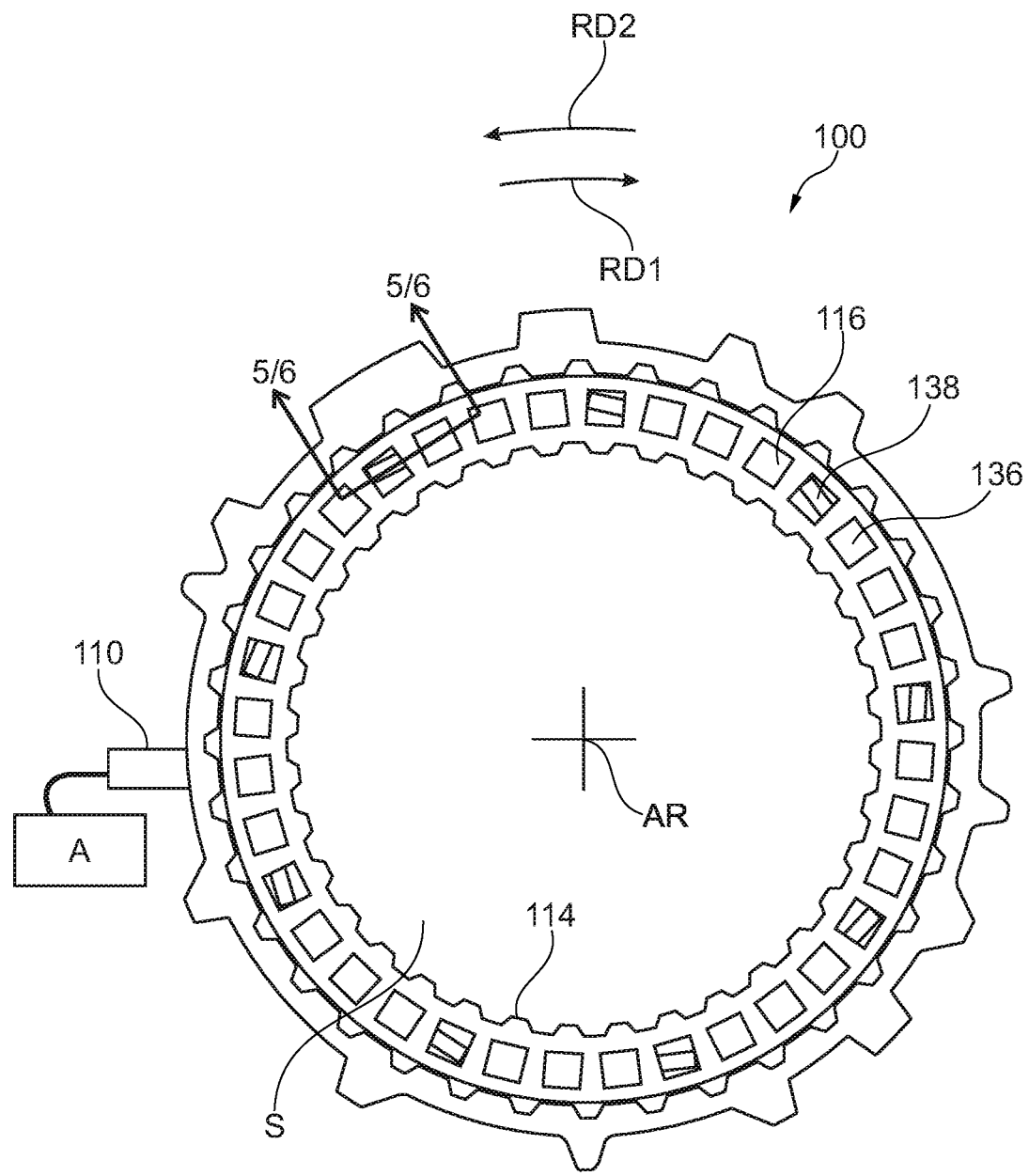
FIG. 1 is a front view of a switchable one-way clutch engaged with a shaft.

FIG. 1 is a front view of switchable one-way clutch 100 engaged with a shaft.

Figure 2:
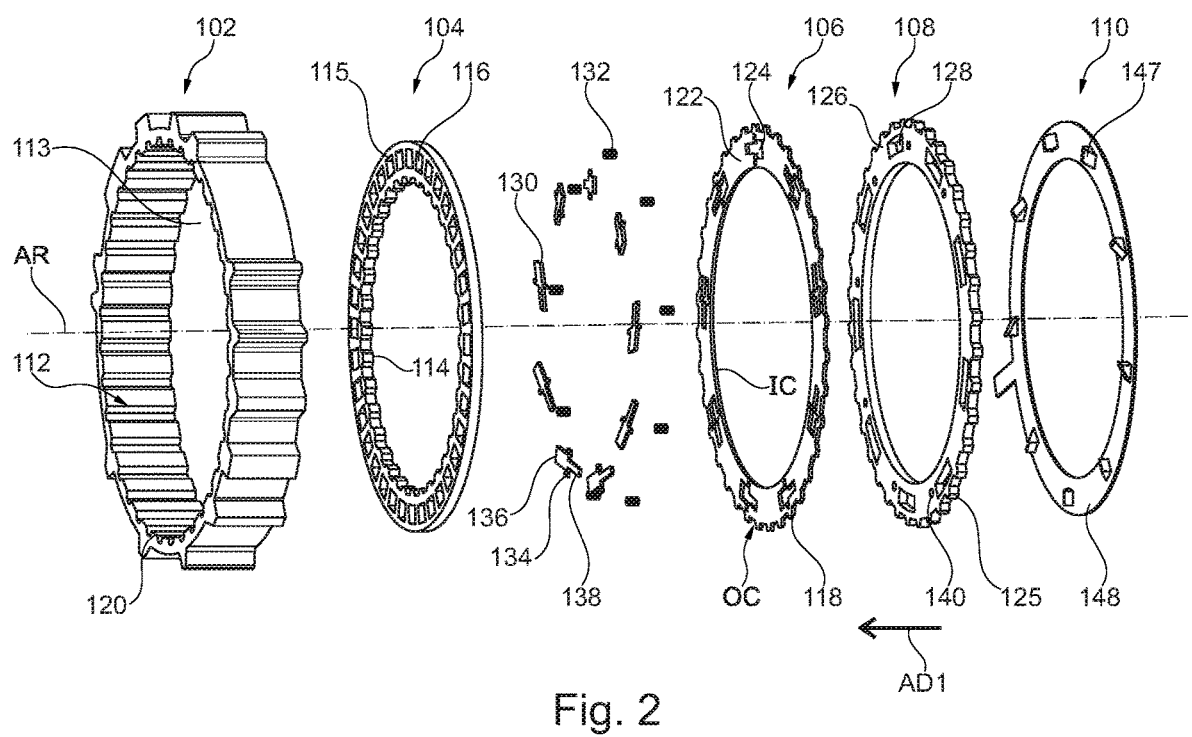
FIG. 2 is an exploded view of the switchable one-way clutch shown in FIG. 1.

FIG. 2 is an exploded view of switchable one-way clutch 100 shown in FIG. 1. The following should be viewed in light of FIGS. 1 and 2. Switchable one-way clutch 100 includes ring-shaped case 102; ring-shaped drive plate 104 supported for rotation around axis of rotation AR; ring-shaped pocket plate 106; ring-shaped spring plate 108; and ring-shaped actuator plate 110.

Figure 3:
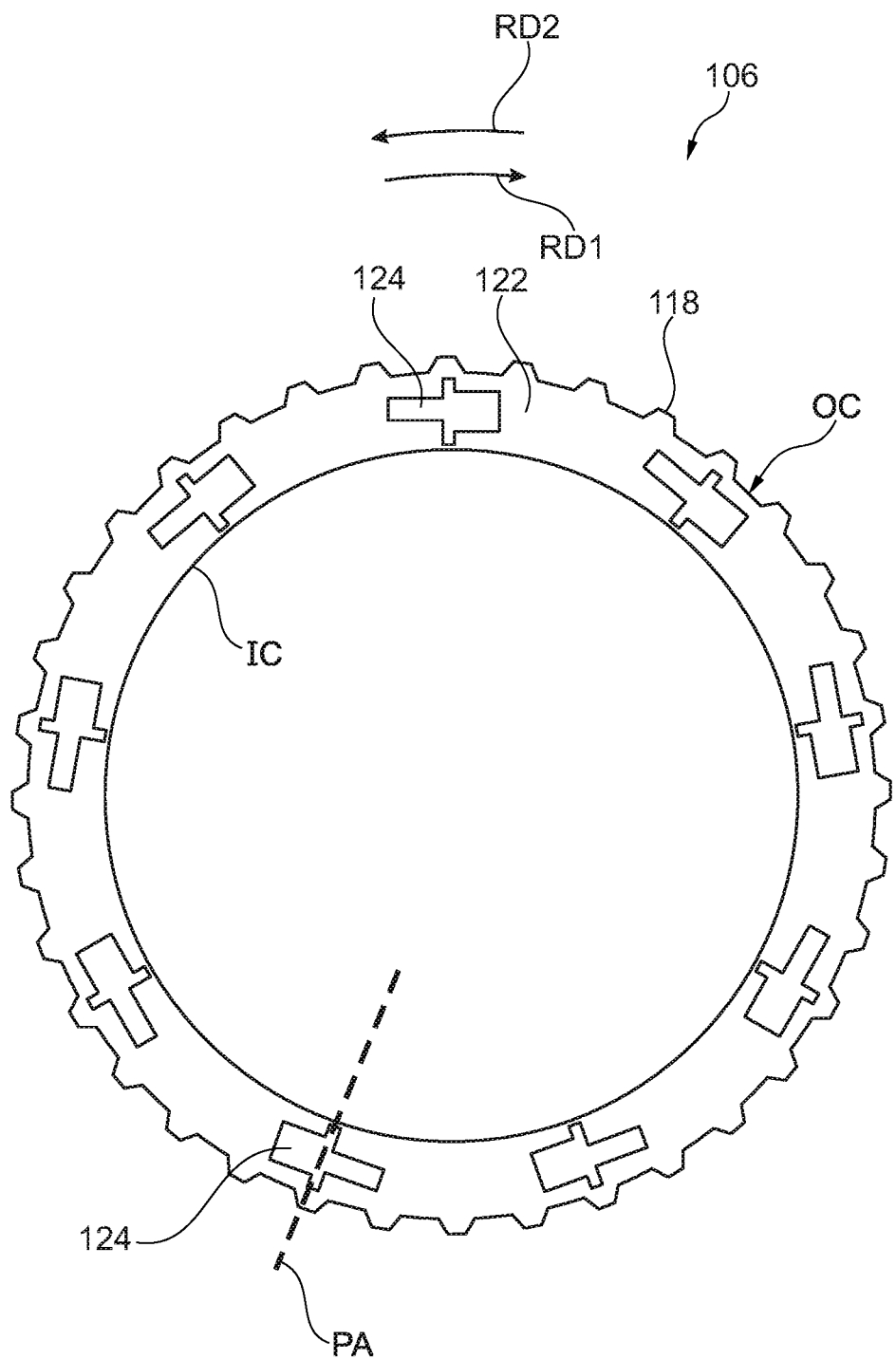
FIG. 3 is a front view of a pocket plate shown in FIG. 1.

FIG. 3 is a front view of pocket plate 106 shown in FIG. 1. The following should be viewed in light of FIGS. 1 through 3. Case 102 includes radially inner surface 112 defining central opening 113. Drive plate 104 is disposed within central opening 113, includes splines 114 arranged to non-rotatably connect to shaft S, and includes planar surface 115 defining axially-facing openings 116. Pocket plate 106 is non-rotatably connected to case 102, for example plate 106 includes splines 118 meshed with splines 120 of surface 112. Plate 106 includes planar surface 122 defining axially-facing openings 124. Plate 108 is non-rotatably connected to case 102, for example plate 108 includes splines 125 meshed with splines 120 of surface 112. Plate 108 includes planar surface 126 defining axially-facing openings 128. Pocket plate 106 is axially disposed between case 102 and spring plate 108. Spring plate 108 is axially disposed between pocket plate 106 and actuator plate 110. Plates 106 and 108 are axially fixed with respect to case 102. Actuator plate 110 is axially fixed with respect to case 102 and rotatable with respect to case 102.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with springs for the vibration damper, are not considered non-rotatably connected due to the compression and unwinding of the springs. Without a further modifier, the non-rotatable connection between or among components is assumed for rotation in any direction. However, the non-rotatable connection can be limited by use of a modifier. For example, "non-rotatably connected for rotation in circumferential direction CD1," defines the connection for rotation only in circumferential direction CD1.

Figure 4:
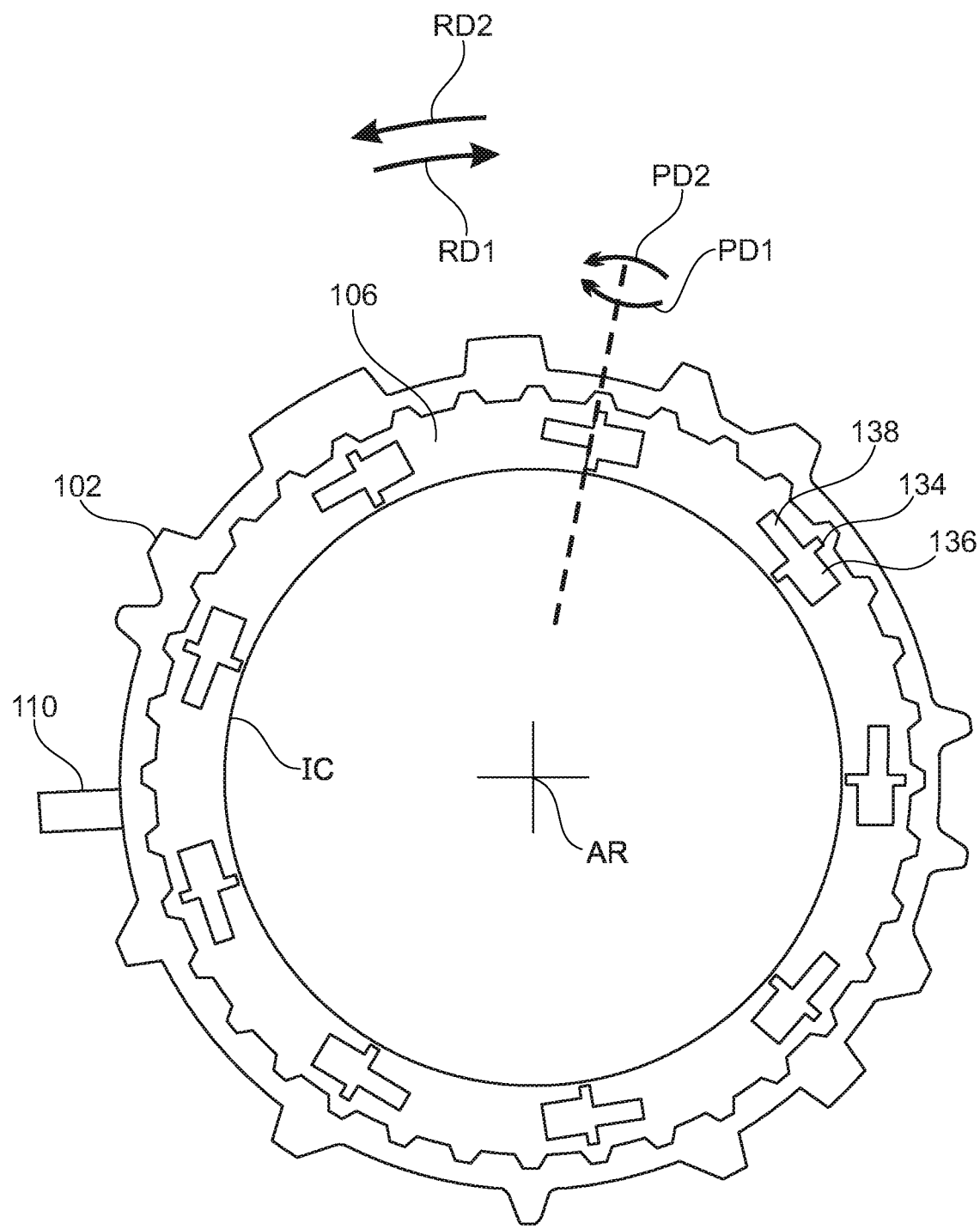
FIG. 4 is a front view of the switchable one-way clutch shown in FIG. 1 with a drive plate removed.

FIG. 4 is a front view of switchable one-way clutch 100 shown in FIG. 1 with drive plate 104 removed. The following should be viewed in light of FIGS. 1 through 4. Switchable one-way clutch 100 includes pairs of struts 130 and springs 132. Each strut 130: is at least partly disposed in an opening 124; is pivotable around pivot axis PA passing through opening 124, inner circumference IC of plate 106, and outer circumference OC of plate 106; and includes central portion 134, engagement portion 136, and control portion 138. Central portions 134 are disposed in openings 124. Pivot axis PA pass through portions 134. Planar surface 122 extends from inner circumference IC to outer circumference OC.

Engagement portions 136 and control portions 138 extend from central portions 134. Each spring 132 is in contact with spring plate 108 and an engagement portion 136. In the example of FIG. 1: engagement portion 136 extends from central portion 134 at least partly in rotational direction RD1; and control portion 138 extends from central portion 134 at least partly in rotational direction RD2, opposite direction RD1. In the example of FIG. 1, spring plate 108 includes recesses 140, holding springs 132.

Figure 5:
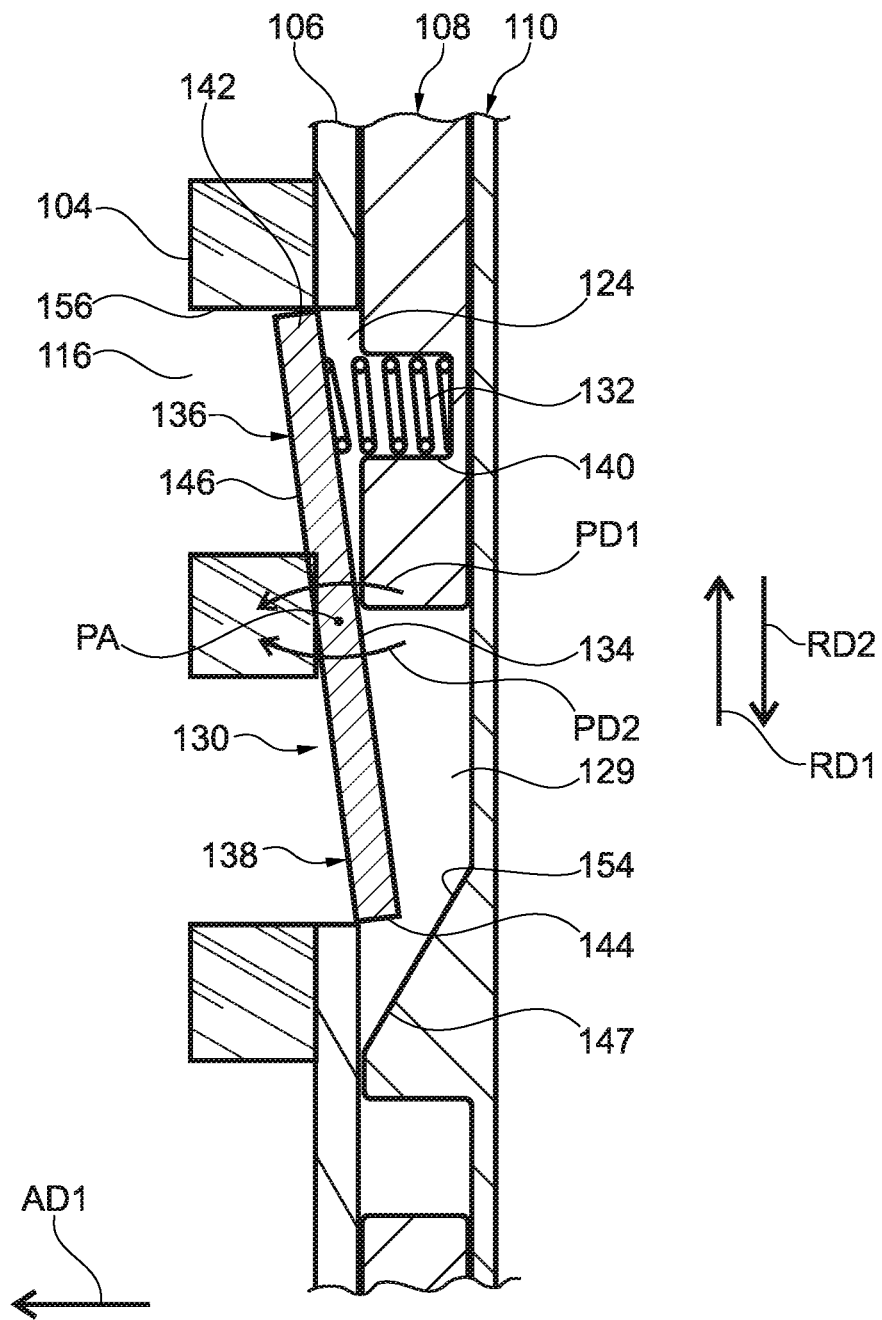
FIG. 5 is a cross-sectional view generally along line 5/6-5/6 in FIG. 1 with the switchable one-way clutch in a locked mode; and, FIG. 6 is a cross-sectional view generally along line 5/6-5/6 in FIG. 1 with the switchable one-way clutch in a free-wheel mode.

FIG. 5 is a cross-sectional view generally along line 5/6-5/6 in FIG. 1 with switchable one-way clutch 100 in a locked mode. The following should be viewed in light of FIGS. 1 through 5. In the example of FIG. 1, in the locked mode of one-way clutch 100, springs 132 urge engagement portions 136 in pivot direction PD1 around pivot axis PA and into openings 116. Rotation of drive plate 104, with respect to case 102 and in rotational direction RD2 is blocked. For example, springs 132 pivot distal ends 142 of engagement portions 136 into openings 116, springs 132 pivot distal ends 144 of control portions 138 into openings 128. In the example of FIG. 1, rotation of drive plate 104, with respect to case 102, in rotational direction RD1 is enabled. For example, as drive plate 104 rotates in direction RD1, plate 104 slides over sides 146 of engagement portions 136, displacing ends 142 from openings 116. In the example of FIG. 1, in the locked mode: struts 130 are located in openings 116, 124, and 128; and springs 132 urge struts in direction PD1 to hold portions 136 in openings 116.

Figure 6:
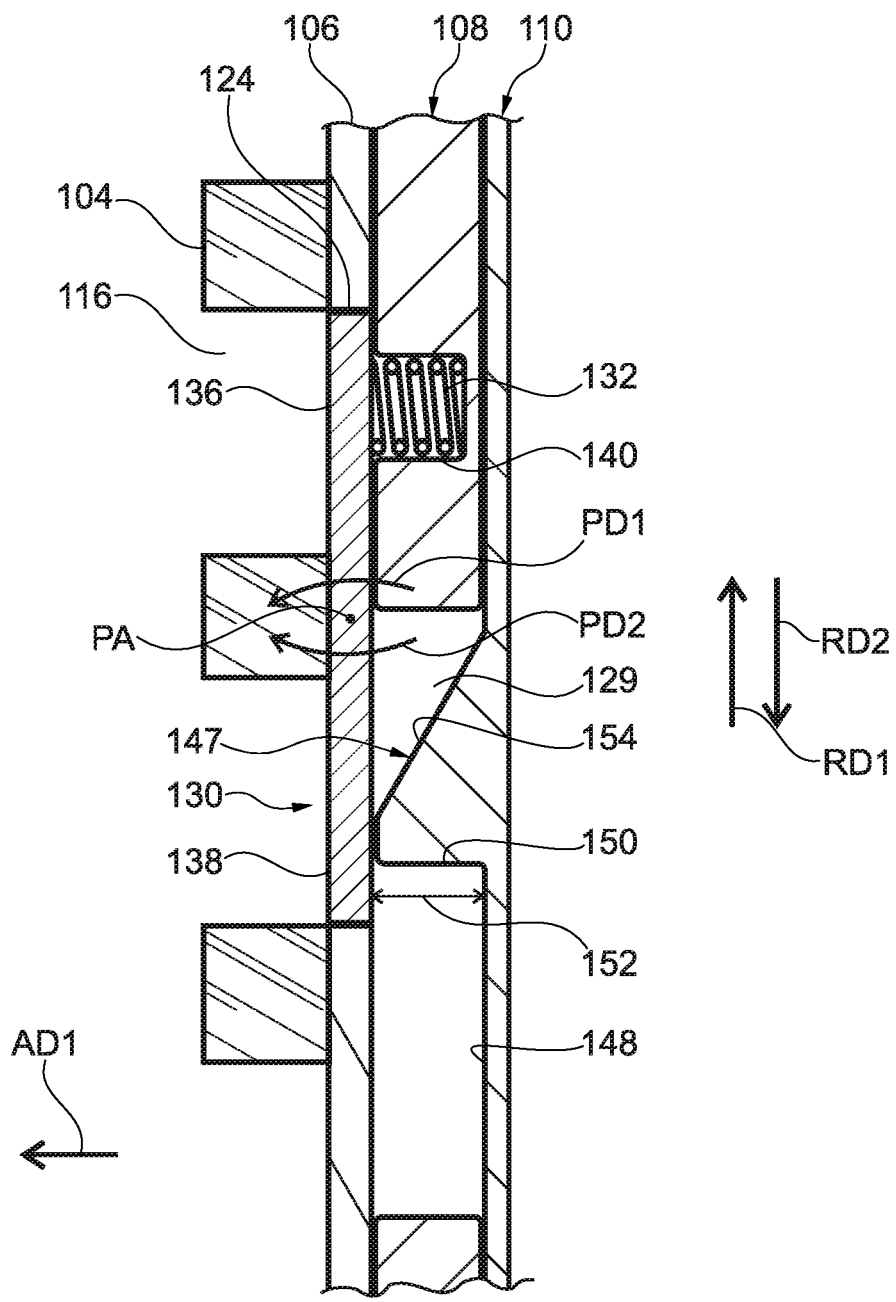

FIG. 6 is a cross-sectional view generally along line 5/6-5/6 in FIG. 1 with switchable one-way clutch 100 in a free-wheel mode. The following should be viewed in light of FIGS. 1 through 6. In the example of FIG. 1, in the free-wheel mode of one-way clutch 100: actuator plate 110 holds engagement portions 136 out of openings 116; and rotation of drive plate 104, with respect to case 102 and in rotational directions RD1 and RD2, is enabled. In the example of FIG. 1, in the free-wheel mode, struts 130 are located in openings 124, and are out of openings 116 and 128.

In the example of FIG. 1, actuator plate 110 includes features 147 extending from surface 148 of actuator plate 110 in axial direction AD1, parallel to axis AR. In the example of FIG. 1, features 148 are ramps sloping from surface 148 in direction AD1 along direction RD2. Ends 150 of ramps 148 are at maximum distance 152 from surface 148 of plate 110. To transition from the locked mode to the free-wheel mode of one-way clutch 100, actuator plate 110 is arranged to be rotated by actuator A (shown schematically in FIG. 1) in direction RD1 and with respect to case 102; surfaces 154 of ramps 148 slide along control portions 138, displacing portions 138 in direction AD1 to pivot struts 130 in pivot direction PD2, opposite direction PD1, and displace distal ends 142 out of openings 116 and into openings 124. Engagement portions 138 compress springs 132 against spring plate 108. Actuator A can be any actuator known in the art.

In an example embodiment (not shown), in the locked mode, portions 138 are in contact with surfaces 154, without pivoting struts 130 in direction PD2.

To transition from the free-wheel mode to the locked mode, actuator plate 110 is arranged to be rotated by actuator A in direction RD2 and with respect to case 102. Surfaces 154 slide along portions 138. Springs 132: unwind and displace portions 136 in axial direction AD1; and pivot struts 130 in direction PD1 to displace portions 136 into openings 116. Rotation of drive plate 104 in direction RD2 brings distal ends 142 into contact with walls 156 of drive plate 104, blocking further rotation of drive plate 104 in direction RD2.

Plates 104, 106, and 108 can be axially retained within case 102 by any means known in the art, including, but not limited to, snap rings.

In the example of FIG. 1 and in the locked mode, every strut 130 is disposed in a respective opening 116. In an example embodiment (not shown), not every strut 130 is disposed in a respective opening 116 in the locked mode.

The following should be viewed in light of FIGS. 1 through 6. The following describes a method for operating a switchable one-way clutch including a ring-shaped case including a radially inner surface defining a central opening, a drive plate radially enclosed by the radially inner surface, supported for rotation around an axis of rotation, arranged to non-rotatably connect to a shaft, and defining a plurality of openings, a first plate non-rotatably connected to the radially inner surface and defining a first opening, a second plate non-rotatably connected to the radially inner surface and defining a second opening, an actuator plate including a planar surface and a feature extending from the planar surface in an axial direction parallel to the axis of rotation, the axial direction from the actuator plate toward the drive plate, a strut including a central portion disposed in the first opening, an engagement portion, and a control portion; and a spring in contact with the engagement portion and the second plate. A first step urges, with the spring, the engagement portion in a first pivot direction around a pivot axis and into a first opening included in the plurality of openings. A second step enables a rotation of the drive plate with respect to the ring-shaped case and in a first rotational direction around the axis of rotation. A third step blocks, with the strut, a rotation of the drive plate with respect to the ring-shaped case in a second rotational direction opposite the first rotational direction. A fourth step rotates, with an actuator, the actuator plate in the first rotational direction. A fifth step slides the feature along the control portion in the first rotational direction. A sixth step pivots, with the feature, the control portion out of the first opening included in the plurality of openings. A seventh step enables a rotation of the drive plate with respect to the ring-shaped case and in the second rotational direction around the axis of rotation.

A eighth step rotates, with the actuator, the actuator plate in the second rotational direction. A ninth step slides the feature along the control portion in the second rotational direction. A tenth step pivots, with the spring, the engagement portion into a second opening included in the plurality of openings. An eleventh step blocks, with the engagement portion, rotation of the drive plate, with respect to the ring-shaped case, in the second rotational direction.

The axial direction is from the actuator plate toward the drive plate. Sliding the feature along the control portion in the first rotational direction includes sliding a ramp, sloping in the axial direction along the second rotational direction, along the control portion. Sliding the feature along the control portion in the second rotational direction includes sliding the ramp along the control portion.

It is understood that clutch 100 is not limited to the orientation shown in FIGS. 1 through 6. For example: engagement portions 136 can extend from central portions 134 in rotational direction RD2; control portions 138 can extend from central portions 134 in rotational direction RD1; in the locked mode, rotation of drive plate 104, with respect to case 102 and in rotational direction RD2 can be enabled and rotation in direction RD1 can be blocked; ramps 148 can extend in axial direction AD1 along direction RD1; to transition from the locked mode to the free-wheel mode of one-way clutch 100, actuator plate 110 can arranged to be rotated by actuator A, in direction RD2 and with respect to case 102; and to transition from the free-wheel mode to the locked mode: actuator plate 110 can arranged to be rotated by actuator A, in direction RD1 and with respect to case 102.

Switchable one-way clutch 100 provides a package with a minimized axial footprint. For example, none of plates 104, 106, 108, or 110 are axially displaced as part of operating clutch 100. Therefore, no axial spacing is required among plates 104, 106, 108, or 110 to accommodate axial displacement, decreasing the overall axial length of clutch 100. The transitions between the locked mode and the free-wheel mode are implemented by rotating, not axially displacing actuator plate 110. Rotatable actuator plate 110 also enables clutch 100 to utilize available radial space for actuation.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD1 axial direction
AR axis of rotation
IC inner circumference, pocket plate
OC outer circumference, pocket plate
PA pivot axis
PD1 pivot direction
PD2 pivot direction
RD1 circumferential direction
RD2 circumferential direction
S shaft
100 switchable one-way clutch
102 ring-shaped case
104 ring-shaped drive plate
106 ring-shaped pocket plate
108 ring-shaped spring plate
110 ring-shaped actuator plate
112 radially inner surface, case
113 central opening, case
114 spline, drive plate
115 surface, drive plate
116 openings, drive plate 118 spline, pocket plate
120 spline, drive plate
122 planar surface, pocket plate
124 opening, pocket plate
125 spline, spring plate
126 planar surface, spring plate
128 opening, spring plate
130 strut
132 spring
134 central portion, strut
136 engagement portion, strut
138 control portion, strut
140 recess, spring plate
142 distal end, engagement portion
144 distal end, control portion
146 surface, engagement portion
147 feature, actuator plate
148 surface, actuator plate
150 end, ramp
152 distance
154 surface, ramp
156 wall, drive plate

The invention claimed is:

1. A switchable one-way clutch, comprising:
a ring-shaped case including a radially inner surface;
a drive plate radially enclosed by the radially inner surface, supported for rotation around an axis of rotation, arranged to non-rotatably connect to a shaft, and defining a plurality of openings;
a first plate non-rotatably connected to the radially inner surface of the ring-shaped case and defining a first opening;
a second plate non-rotatably connected to the radially inner surface of the ring-shaped case;
a rotatable actuator plate;
a strut supported for pivoting around a pivot axis, the pivot axis extending in a radial direction, the strut including a central portion disposed in the first opening and through which the pivot axis passes, an engagement portion extending from the central portion, and a control portion extending from the central portion; and,
a spring in contact with the second plate and the engagement portion, wherein in a locked mode of the switchable one-way clutch, the spring urges the engagement portion in a first pivot direction around the pivot axis and into an opening included in the plurality of openings, a rotation of the drive plate with respect to the ring-shaped case and in a first rotational direction around the axis of rotation is enabled, and a rotation of the drive plate with respect to the ring-shaped case in a second rotational direction opposite the first rotational direction is blocked; and wherein to transition from the locked mode to a free-wheel mode of the switchable one-way clutch, in which the rotation of the drive plate with respect to the ring-shaped case and in the second rotational direction is enabled, the rotatable actuator plate is arranged to be rotated by an actuator, and the rotatable actuator plate is arranged to contact and displace the control portion to pivot the strut in a second pivot direction, opposite the first pivot direction, and pivot the engagement portion out of the opening included in the plurality of openings.

2. The switchable one-way clutch of claim 1, wherein to transition from the locked mode to the free-wheel mode, a portion of the rotatable actuator plate is arranged to slide across the control portion in the first rotational direction.

3. The switchable one-way clutch of claim 1, wherein to transition from the free-wheel mode to the locked mode, a portion of the rotatable actuator plate is arranged to slide across the control portion in the second rotational direction.

4. The switchable one-way clutch of claim 1, wherein the rotatable actuator plate is axially fixed with respect to the ring-shaped case.

5. The switchable one-way clutch of claim 1, wherein the first plate, the second plate, and the rotatable actuator plate are axially fixed with respect to the ring-shaped case.

6. The switchable one-way clutch of claim 1, wherein the second plate defines a second opening; and wherein in the locked mode, at least a segment of the control portion is disposed in the second opening.

7. The switchable one-way clutch of claim 1, wherein the second plate is axially disposed between the first plate and the rotatable actuator plate.

8. The switchable one-way clutch of claim 1, wherein the first plate is axially disposed between the second plate and the drive plate.

9. The switchable one-way clutch of claim 1, wherein the first plate includes a radially inner circumference, a radially outer circumference, and a planar surface extending from the radially inner circumference to the radially outer circumference.

10. The switchable one-way clutch of claim 9, wherein the planar surface defines the first opening.

11. The switchable one-way clutch of claim 1, wherein the rotatable actuator plate includes a planar surface and a feature extending from the planar surface in an axial direction parallel to the axis of rotation; and wherein to transition between the locked mode and the free-wheel mode, the rotatable actuator plate is arranged to be rotated by the actuator to slide the feature along the control portion in the first rotational direction or in the second rotational direction.

12. The switchable one-way clutch of claim 11, wherein the axial direction is from the rotatable actuator plate toward the drive plate, and the feature includes a ramp extending from the planar surface in the axial direction; wherein in the free-wheel mode, the ramp is arranged to contact the control portion and hold the engagement portion out of engagement with the drive plate; and wherein to transition from the free-wheel mode to the locked mode, the actuator is arranged to be rotated by the actuator to slide the ramp along the control portion in the second rotational direction, and the spring is arranged to pivot the engagement portion into the opening included in the plurality of openings.

13. The switchable one-way clutch of claim 11, wherein the axial direction is from the rotatable actuator plate toward the drive plate, and the feature includes a ramp extending from the planar surface in the axial direction; wherein in the free-wheel mode, the ramp is arranged to contact the control portion and hold the engagement portion out of engagement with the drive plate; and wherein to transition from the locked mode to the free-wheel mode, the actuator is arranged to be rotated by the actuator to slide the ramp along the control portion in the first rotational direction, and the ramp is arranged to pivot the engagement portion out of the opening included in the plurality of openings.

14. A switchable one-way clutch, comprising:
a ring-shaped case including a radially inner surface defining a central opening;
a drive plate radially enclosed by the radially inner surface, supported for rotation around an axis of rotation, arranged to non-rotatably connect to a shaft, and defining a plurality of openings;

a first plate non-rotatably connected to the radially inner surface and defining a first opening; a second plate non-rotatably connected to the radially inner surface and defining a second opening; a rotatable actuator plate including a planar surface and a feature extending from the planar surface in an axial direction parallel to the axis of rotation; a strut pivotable around a pivot axis, the strut including a central portion disposed in the first opening and through which the pivot axis passes, an engagement portion extending from the central portion, and a control portion extending from the central portion; and, a spring in contact with the engagement portion and the second plate, wherein in a locked mode of the switchable one-way clutch, the spring urges the engagement portion in a first pivot direction around the pivot axis and into an opening included in the plurality of openings, a rotation of the drive plate with respect to the ring-shaped case and in a first rotational direction around the axis of rotation is enabled, and a rotation of the drive plate with respect to the ring-shaped case in a second rotational direction opposite the first rotational direction is blocked; and wherein to transition from the locked mode to a free-wheel mode of the switchable one-way clutch, in which the rotation of the drive plate with respect to the ring-shaped case and in the second rotational direction is enabled, the rotatable actuator plate is arranged to be rotated by an actuator, the rotatable actuator plate is arranged to slide the feature along the control portion in the first rotational direction, and the feature is arranged to pivot the engagement portion out of the opening included in the plurality of openings.

15. The switchable one-way clutch of claim 14, wherein the rotatable actuator plate is axially fixed with respect to the ring-shaped case.

16. The switchable one-way clutch of claim 14, wherein the second plate is axially disposed between the first plate and the rotatable actuator plate, and the first plate is axially disposed between the second plate and the drive plate.

17. The switchable one-way clutch of claim 14, wherein the feature includes a ramp sloping from the planar surface along the second rotational direction and in an axial direction toward the drive plate; wherein to transition from the free-wheel mode to the locked mode, the actuator is arranged to be rotated by the actuator to slide the ramp along the control portion in the second rotational direction, and the spring is arranged to pivot the engagement portion into the opening included in the plurality of openings; and wherein to transition from the locked mode to the freewheel mode, the actuator is arranged to be rotated by the actuator to slide the ramp along the control portion in the first rotational direction, and the ramp is arranged to pivot the engagement portion out of the opening included in the plurality of openings.

18. A method of operating a switchable one-way clutch, the switchable one-way clutch including a ring-shaped case including a radially inner surface defining a central opening, a drive plate radially enclosed by the radially inner surface, supported for rotation around an axis of rotation, arranged to non-rotatably connect to a shaft, and defining a plurality of openings, a first plate non-rotatably connected to the radially inner surface and defining a first opening, a second plate non-rotatably connected to the radially inner surface and defining a second opening, an actuator plate including a planar surface and a feature extending from the planar surface in an axial direction parallel to the axis of rotation, a strut including a central portion disposed in the first opening, an engagement portion, and a control portion; and a spring in contact with the engagement portion and the second plate, the method comprising:

urging, with the spring, the engagement portion in a first pivot direction around a pivot axis and into a first opening included in the plurality of openings;

enabling a rotation of the drive plate with respect to the ring-shaped case and in a first rotational direction around the axis of rotation;

blocking, with the strut, a rotation of the drive plate with respect to the ring-shaped case in a second rotational direction opposite the first rotational direction;

rotating, with an actuator, the actuator plate in the first rotational direction;

sliding the feature along the control portion in the first rotational direction;

pivoting, with the feature, the engagement portion out of the first opening included in the plurality of openings; and, enabling a rotation of the drive plate, with respect to the ring-shaped case and in the second rotational direction, around the axis of rotation.

19. The method of claim 18, further comprising:

rotating, with the actuator, the actuator plate in the second rotational direction;

sliding the feature along the control portion in the second rotational direction;

pivoting, with the spring, the engagement portion into a second opening included in the plurality of openings; and, blocking, with the engagement portion, rotation of the drive plate, with respect to the ring-shaped case, in the second rotational direction.

20. The method of claim 19, wherein:

the axial direction is from the actuator plate toward the drive plate;

sliding the feature along the control portion in the first rotational direction includes sliding a ramp, sloping in the axial direction along the second rotational direction, along the control portion; and, sliding the feature along the control portion in the second rotational direction includes sliding the ramp along the control portion.

\* \* \* \* \*